(12) United States Patent
Sawai et al.

(10) Patent No.: US 6,550,711 B2
(45) Date of Patent: Apr. 22, 2003

(54) MAGNETIC TAPE APPARATUS

(75) Inventors: Kunio Sawai, Osaka (JP); Hiroshi Hamabata, Osaka (JP); Katsuyuki Yokota, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 72 days.

(21) Appl. No.: 09/841,884

(22) Filed: Apr. 24, 2001

(65) Prior Publication Data
US 2001/0042807 A1 Nov. 22, 2001

(30) Foreign Application Priority Data
May 11, 2000 (JP) ........................................ 2000-139014
(51) Int. Cl.[7] ............................................... G11B 15/32
(52) U.S. Cl. ................... 242/356.3; 242/356.5; 360/96.3; 360/96.4
(58) Field of Search .................... 242/356.3, 356.4, 242/356.5; 360/96.3, 96.4

(56) References Cited

FOREIGN PATENT DOCUMENTS

JP  5-298783  11/1993

*Primary Examiner*—John Q. Nguyen
(74) *Attorney, Agent, or Firm*—Rosenthal & Osha L.L.P.

(57) ABSTRACT

A magnetic tape apparatus has an intermediate gear (19) meshed with an idler gear (22) which is releasably meshed with both a pay-off reel table (2) and a roll-up reel table (3), a drive gear (31) rotatably driven by a capstan motor (10), a driven gear (32) releasably meshed with the drive gear (31) by way of a friction plate, a clutch mechanism (20), and a speed increasing mechanism (27). The speed increasing mechanism (27) has a movable rotary body (37) rotatably mounted around a support shaft (36) and adapted to reciprocate along an axis of the support shaft (36) by means of the clutch mechanism (20). The movable rotary body (37) is provided with a small diametered gear (38) and a large diametered gear (39). In a fast feed mode and a rewind mode, the small diametered gear (38) is meshed with the drive gear (31) while the large diametered gear (39) is meshed with the intermediate gear (19).

5 Claims, 7 Drawing Sheets

MAGNETIC TAPE APPARATUS

BACKGROUND OF THE INVENTION

1. Technical Field to which the Invention Belongs

The present invention relates to a magnetic tape apparatus intended to attain a high speed operation in a fast feed mode and a rewind mode.

2. Related Art

As the prior art of the magnetic tape apparatus, there have been such examples as one disclosed in the Unexamined Japanese Patent Application Publication No. Hei 5-298783. One of the examples will be described referring to FIG. 9. Reference numeral 1 denotes a tape cassette, 2 denotes a pay-off reel table engaged with a pay-off reel of the tape cassette 1, 3 denotes a roll-up reel table engaged with a roll-up reel of the tape cassette 1, 4 denotes movable guide posts for winding a magnetic tape T drawn out from the tape cassette 1 around a head cylinder 5, 6 denotes an all width erase head, 7 denotes a voice erase head, 8 denotes a voice control head, 9 denotes stationary tape guide posts, 10 denotes a capstan motor for rotating a capstan 10a in a normal and a reverse directions, 11 denotes a pinch roller adapted to come into pressure contact with and move away from the capstan 10a, 12 denotes a tension lever for pressing a tension post 12a against the magnetic tape T, 13 denotes a mode switch lever which is placed on a chassis 14 so as to move to and fro in directions of arrow marks a and b.

Figure 9:
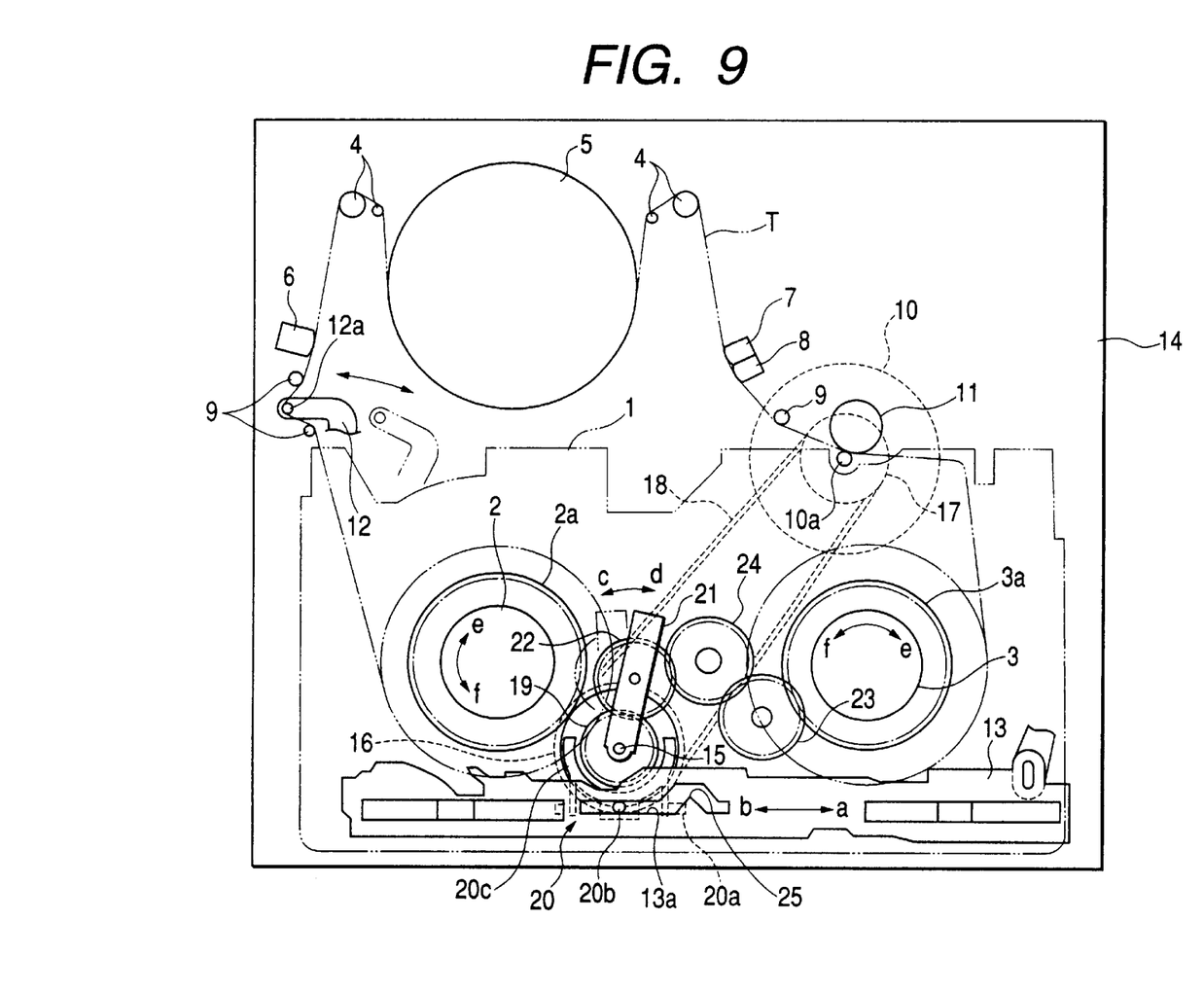
FIG. 9 is a plan view showing a conventional example.

A pivotal shaft 15 is provided on the chassis 14 between the pay-off reel table 2 and the roll-up reel table 3. A belt 18 is wound around a rotatable pulley 16 which is concentrically provided below the pivotal shaft 15 and a pulley 17 which is fixed to the aforesaid capstan 10a. An intermediate gear 19 is rotatably mounted around the pivotal shaft 15, and a clutch mechanism 20 for directly or indirectly connecting the intermediate gear 19 to the pulley 16 is provided. There is provided a rocking arm 21 adapted to rock to and fro in directions of arrow marks c and d around the pivotal shaft 15. An idler gear 22 pivotally fixed to an end of the rocking arm 21 is meshed with the intermediate gear 19. On both sides of the idler gear 22, there are arranged a roll-up gear 24 which is associated with teeth 3a of the roll-up reel table 3 by way of a gear 23, and teeth 2a formed around the pay-off reel table 2 in a mutually opposed manner.

The aforesaid clutch mechanism 20 includes a clutch shaft 20a rotatably supported on the chassis 14, a cam pin 20b which is provided projectingly at a middle part of the clutch shaft 20a and adapted to be engaged in a cam groove 13a of the mode switch lever 13, and an arm 20c provided projectingly on the clutch shaft 20a and adapted to be engaged with the intermediate gear 19.

In the above described structure, in a play back mode, the magnetic tape T is drawn out from the tape cassette 1 by means of the movable tape guide posts 4 and wound around the head cylinder 5. At the same time, the tension lever 12 is erected to push the tension post 12a against the magnetic tape T so that the magnetic tape T is placed under tension so as to be in a loading state. By driving the capstan motor 10 in the normal direction, the rocking arm 21 is rocked in the direction of the arrow mark d by way of the pulleys 16, 17 and the belt 18. In this manner, the idler gear 22 is allowed to mesh with the roll-up gear 24, and a rotary drive force of the pulley 16 is transmitted to the roll-up reel table 3 by way of a slip mechanism (not shown), the idler gear 22, and the gears 23, 24, and thus, the roll-up reel table 3 is rotated in a direction of an arrow mark e to roll up the magnetic tape T.

In order to switch the mode from the play back mode to a play back rewind mode, the capstan motor 10 is rotated in the reverse direction. This allows the rocking arm 21 to be rocked in the direction of the arrow mark c by way of the pulleys 16, 17 and the belt 18, and the idler gear 22 is meshed with the teeth 2a of the pay-off reel table 2. At the same time, the rotary drive force of the pulley 16 is transmitted to the pay-off reel table 2 by way of the slip mechanism, the intermediate gear 19 and the idler gear 22, and thus, the pay-off reel table 2 is rotated in a direction of an arrow mark f to roll up the magnetic tape T.

In a fast feed mode and a rewind mode, the mode switch lever 13 is shifted in the direction of the arrow mark b allowing an angled portion 25 of the cam groove 13a to be engaged with the cam pin 20b. This allows the intermediate gear 19 to be directly connected to the pulley 16 by means of the arm 20c of the clutch mechanism 20. In this manner, the rotary drive force of the pulley 16 is directly transmitted to the intermediate gear 19 so that the pay-off reel table 2 or the roll-up reel table 3 rolls up the magnetic tape T.

Problems to be Solved

In the above described structure, in the fast feed mode and the rewind mode, the intermediate gear 19 is directly connected to the pulley 16 so as to directly rotate the pay-off reel table 2 or the roll-up reel table 3 by means of the capstan motor 10. However, since a speed increasing function is not provided, there has been a drawback that speed up of the rotation is limited, and a considerable time is required for the fast feed and the rewind of the magnetic tape T.

In view of such a conventional drawback as described above, it is an object of the invention to provide a magnetic tape apparatus in which fast feed and rewind of a magnetic tape can be conducted at high speed.

Means for Solving the Problems

In order to attain the above described object, the invention as in aspect 1 is a magnetic tape apparatus comprising an intermediate gear meshed with an idler gear which can be releasably meshed with a pay-off reel table and a roll-up reel table, a drive gear rotatably driven by drive means, and a driven gear which can be releasably meshed with the drive gear by way of a slip mechanism, and constructed in such a manner that the intermediate gear is directly connected to the drive gear in a fast feed mode and a rewind mode and indirectly connected to the drive gear by way of the slip mechanism and the driven gear in a play back mode and a play back rewind mode, characterized in that the intermediate gear is connected to the drive gear by way of a speed increasing mechanism in the fast feed mode and the rewind mode.

According to the above described structure, the fast feed and the rewind of the magnetic tape can be finished in a short time, because the rotation speed of the pay-off reel table or the roll-up reel table can be increased by the speed increasing mechanism in the fast feed mode and the rewind mode.

The invention according to aspect 2 is, in the invention as in aspect 1, characterized in that the speed increasing mechanism includes a movable rotary body which is rotatably mounted around a support shaft and adapted to reciprocate along an axis of the support shaft, the movable rotary body being provided with a small diametered gear and a large diametered gear, and in the fast feed mode and the rewind mode, the large diametered gear is meshed with the intermediate gear while the small diametered gear is meshed with the drive gear.

According to the above described structure, in the fast feed mode and the rewind mode, the rotation speed of the pay-off reel table or the roll-up reel table can be increased due to a gear ratio between the large diametered gear and the small diametered gear. Moreover, because the structure of the speed increasing mechanism is simple, the magnetic tape apparatus is difficult to be broken and can be manufactured at a low cost.

The invention according to aspect 3 is, in the invention as in aspect 2, characterized in that the movable rotary body is integrally provided with a large high speed gear which is larger in diameter than the large diametered gear, and in the fast feed mode and the rewind mode, the large high speed gear is meshed with the intermediate gear while the small diametered gear is meshed with the drive gear.

According to the above described structure, in the fast feed mode and the rewind mode, by meshing the large high speed gear integrally formed with the movable rotary body with the intermediate gear, the rotation speed of the pay-off reel table or the roll-up reel table can be further increased.

The invention according to aspect 4 is, in the invention as in aspect 2 or 3, characterized in that the movable rotary body is provided with a large low speed gear, and in the play back mode and the play back rewind mode, the large diametered gear is meshed with the intermediate gear while the large low speed gear is meshed with the driven gear.

According to the above described structure, only by meshing the large low speed gear provided on the movable rotary body with the driven gear, the speed increasing mechanism can be switched also to the play back mode and the play back rewind mode and can be conveniently used.

The invention according to aspect 5 is, in the invention as in aspect 4, characterized in that the movable rotary body is provided with a neutral position in which the small diametered gear and the large low speed gear are not meshed with each other, and the movable rotary body is set at the neutral position in a stop mode.

According to the above described structure, by switching the mode from the fast feed mode and the rewind mode to the stop mode, the movable rotary body is set in the neutral position, thereby to instantaneously interrupt the rotary drive force of the drive gear. Therefore, the magnetic tape can be prevented from being excessively rolled up around the pay-off reel table or the roll-up reel table.

DETAILED DESCRIPTION OF THE PREFERRED EMBODIMENTS

Mode for Carrying Out the Invention

Figure 1:
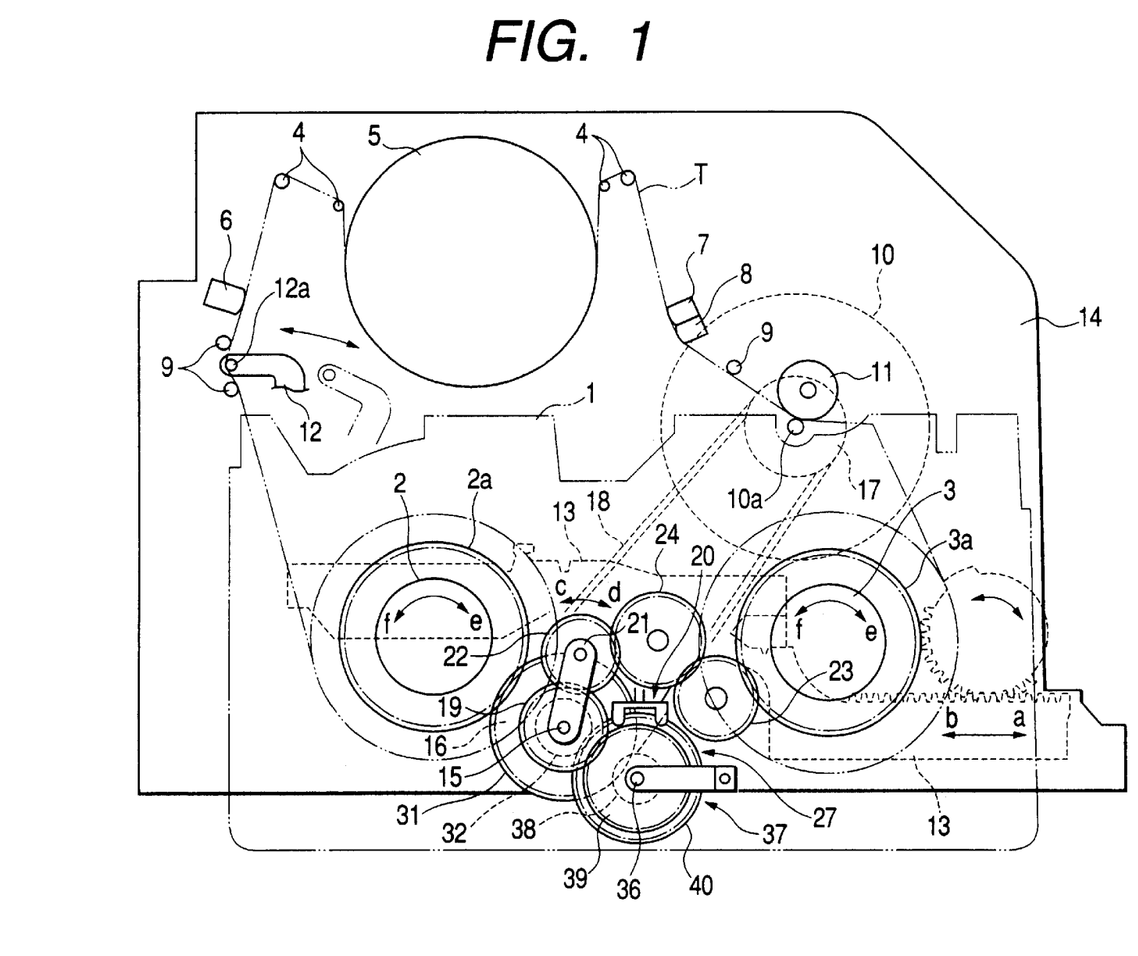
FIG. 1 is a plan view of a magnetic tape apparatus according to an embodiment of the invention.

FIG. 1 shows a magnetic tape apparatus according to an embodiment of the invention, in which a speed increasing mechanism 27 is provided in an opposed relation to the pulley 16. Same parts as those of the prior art as shown in FIG. 9 will be represented by the same reference numerals and description of the parts will be omitted.

Figure 2:
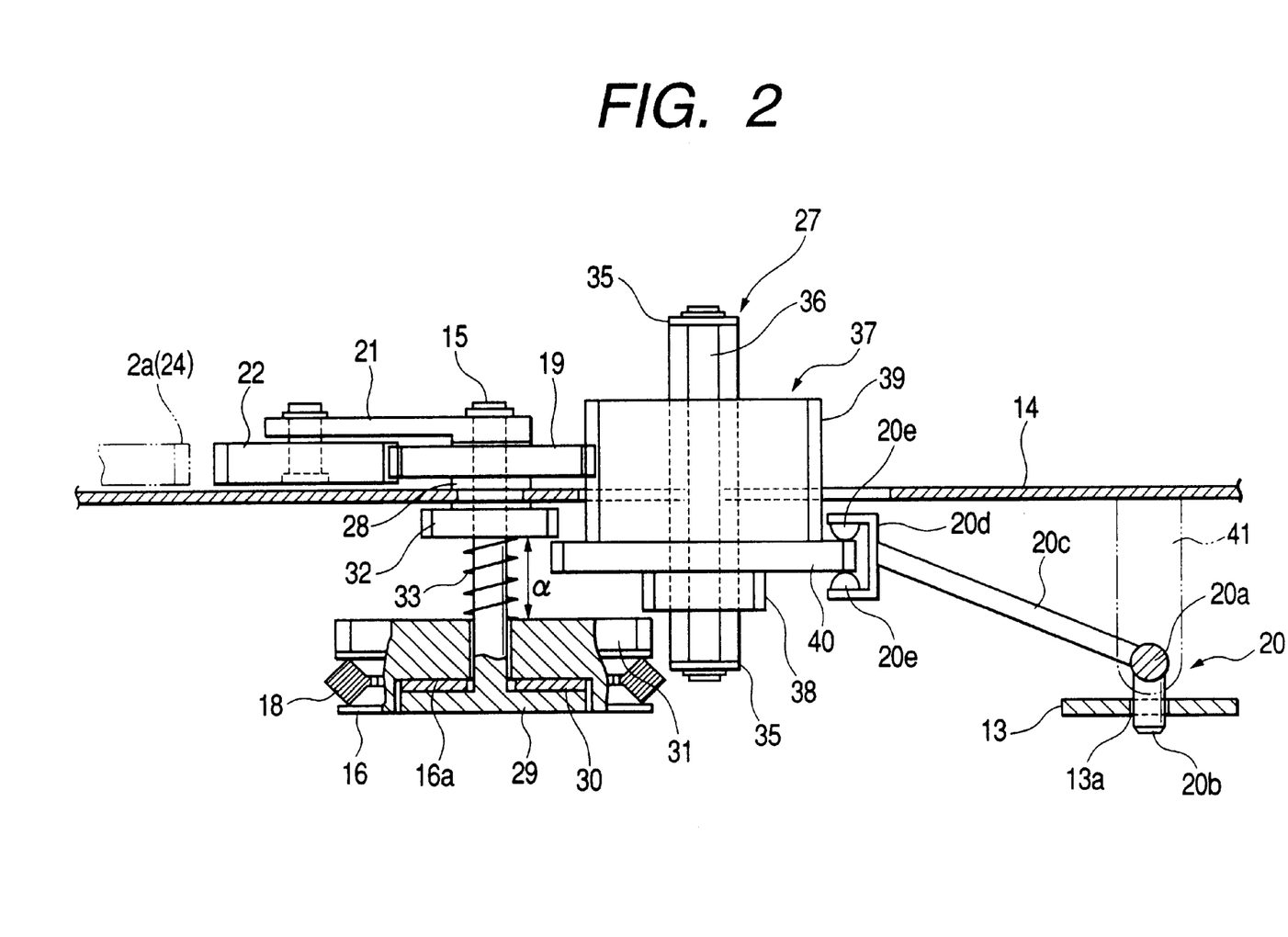
FIG. 2 is an enlarged view in a longitudinal section of the same in a stop mode.

As shown in FIG. 2, the aforesaid pulley 16 is rotatably mounted around the pivotal shaft 15 which is pivotally supported on the chassis 14 by way of a bearing 28. A concave bottom face 16a formed in a lower face of the pulley 16 is releasably engaged with a disc 29 which is provided at a lower end of the pivotal shaft 15 by way of a friction plate (slip mechanism) 30 made of felt or the like which has a large friction resistance. A drive gear 31 is integrally formed at an upper end of the pulley 16.

As shown in FIG. 2, a driven gear 32 is fixed to the pivotal shaft 15 at a determined distance a from the drive gear 31. The pulley 16 is urged against the friction plate 30 by a spring 33 which is mounted around the pivotal shaft 15 between the driven gear 32 and the drive gear 31, so that the rotary drive force of the pulley 16 is transmitted to the driven gear 32 by way of the friction plate 30.

Figure 3:
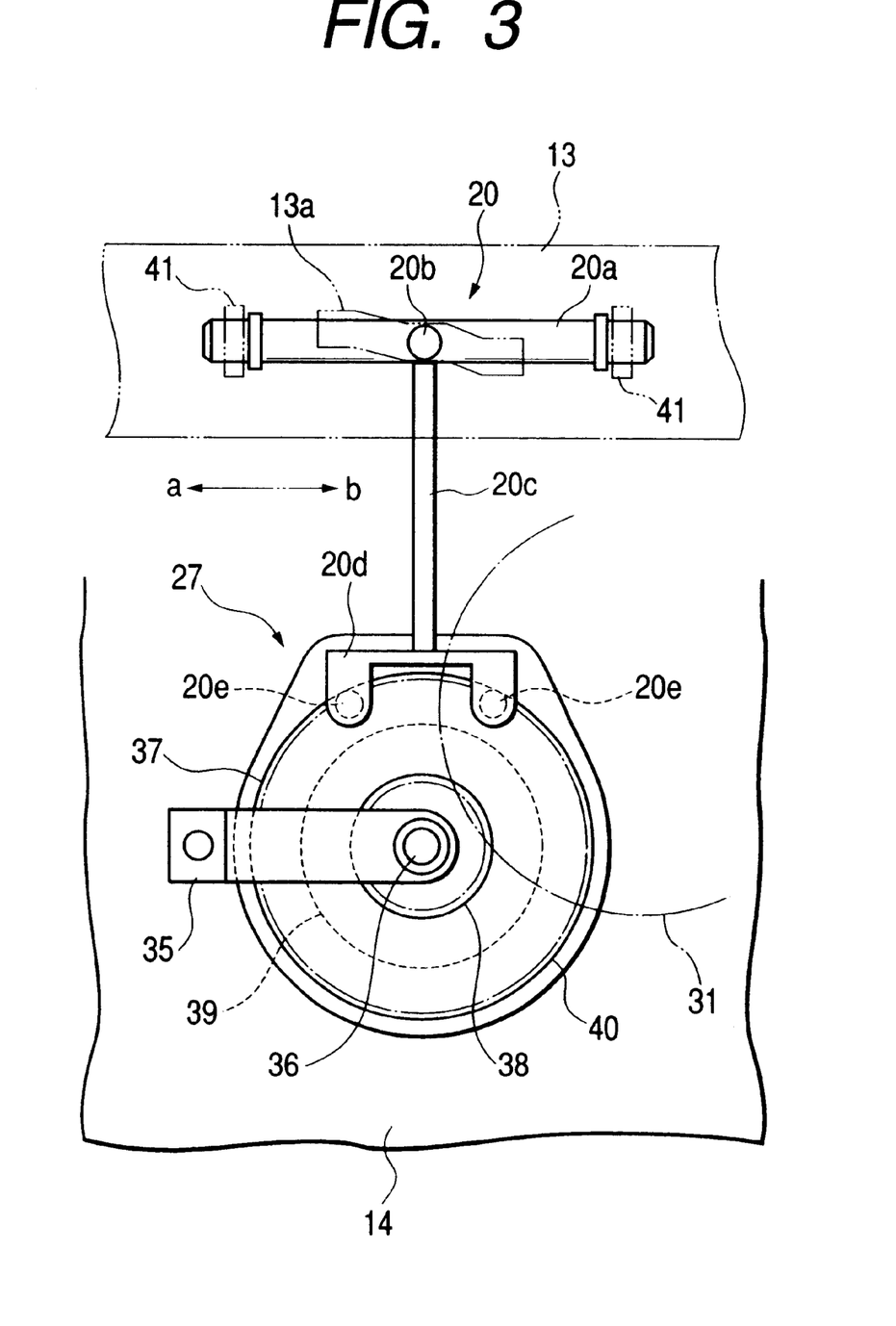
FIG. 3 is an enlarged bottom view of an essential part of the same.

The above mentioned speed increasing mechanism 27 has, as shown in FIGS. 2 and 3, a support shaft 36 arranged in parallel to the pivotal shaft 15 and fixed to the chassis 14 at both upper and lower ends thereof by way of support frames 35, a movable rotary body 37 rotatably mounted around the support shaft 36 and adapted to reciprocate along an axis of the support shaft 36. Below the movable rotary body 37, there is provided a small diametered gear 38 which can be meshed with the drive gear 31, and above the movable rotary body 37, there is provided a large diametered gear 39 which can be meshed with the intermediate gear 19. Moreover, between the small diametered gear 38 and the large diametered gear 39 of the movable rotary body 37, there is provided a large low speed gear 40 which can be meshed with the driven gear 32. Further, as shown in FIG. 2, when the movable rotary body 37 is set at a neutral position, the small diametered gear 38 is not in mesh with the large low speed gear 40 by the presence of the aforesaid distance $\alpha$.

As shown in FIGS. 2 and 3, a substantially C-shaped frame body 20d is fixed to a tip end of the arm 20c of the clutch mechanism 20, and two pairs of upper and lower semi-spherical projections 20e which are formed on an inner face of the frame body 20d are engaged with upper and lower faces of the large low speed gear 40 at its circumferential edge. By shifting the mode switch lever 13 in the directions of the arrow marks a and b, the arm 20c is moved up and down by way of the cam pin 20b engaged in the cam groove 13a, thereby to reciprocate the movable rotary body 37 along the support shaft 36. Numeral 41 represents a bearing which rotatably supports the cam shaft 20a.

Figure 4:
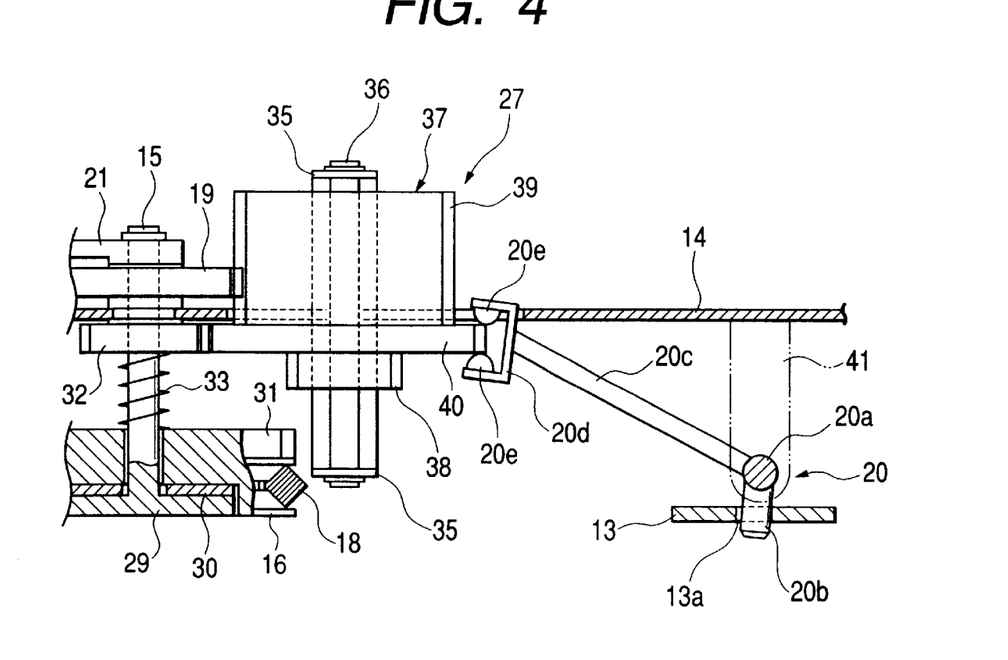
FIG. 4 is an enlarged view in a longitudinal section of the essential part of the same in a play back mode and a play back rewind mode.

In the above described structure, in order to switch the mode from the stop mode as shown in FIG. 2 to the play back mode or the play back rewind mode, the mode switch lever 13 may be shifted in the direction of the arrow mark b. This allows the arm 20c to move upward around the cam shaft 20a by way of the cam pin 20b in cooperation with the cam groove 13a, and the movable rotary body 37 is pushed upward as shown in FIG. 4 thereby to mesh the large low speed gear 40 with the driven gear 32. In this state, the rotary drive force of the pulley 16 is transmitted to the intermediate gear 19 by way of the friction plate 30, the disc 29, the pivotal shaft 15, the driven gear 32, the large low speed gear 40 and the large diametered gear 39, and the magnetic tape T is rolled up around the pay-off reel table 2 or the roll-up reel table 3.

According to the above described structure, the speed increasing mechanism 27 can be switched also into the play back mode and the playback rewind mode, and can be conveniently used.

Figure 5:
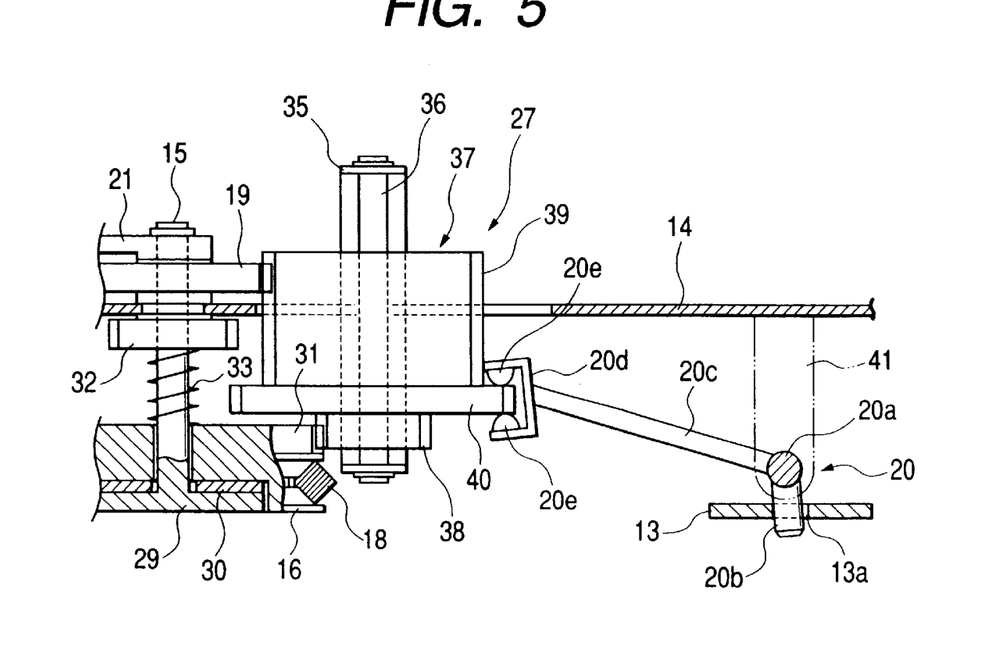
FIG. 5 is an enlarged view in a longitudinal section of the essential part of the same in a fast feed mode and a rewind mode.

In order to switch the mode from the stop mode as shown in FIG. 2 to the fast feed mode or the rewind mode, the mode switch lever 13 may be shifted in the direction of the arrow mark a. This allows the arm 20c to move downward around the cam shaft 20a by way of the cam pin 20b in cooperation with the cam groove 13a, and the movable rotary body 37 is pushed downward as shown in FIG. 5 thereby to mesh the small diametered gear 38 with the drive gear 31. In this state, the rotary drive force of the pulley 16 is transmitted to the intermediate gear 19 by way of the drive gear 31, the small diametered gear 38 and the large diametered gear 39, and the magnetic tape T is rolled up at high speed around the pay-off reel table 2 or the roll-up reel table 3.

According to the above described structure, the rotation speed of the pay-off reel table 2 or the roll-up reel table 3 can be increased due to a gear ratio between the small diametered gear 38 and the large diametered gear 39 of the speed increasing mechanism 27, and the fast feed and the rewind of the magnetic tape T can be finished in a short time. Moreover, because the speed increasing mechanism 27 is constructed simply, including only the small diametered gear 38, the large diametered gear 39 and the large low speed gear 40 provided on the movable rotary body 37 which is mounted around the support shaft 36, the magnetic tape apparatus is difficult to be broken and can be manufactured at a low cost.

Figure 6:
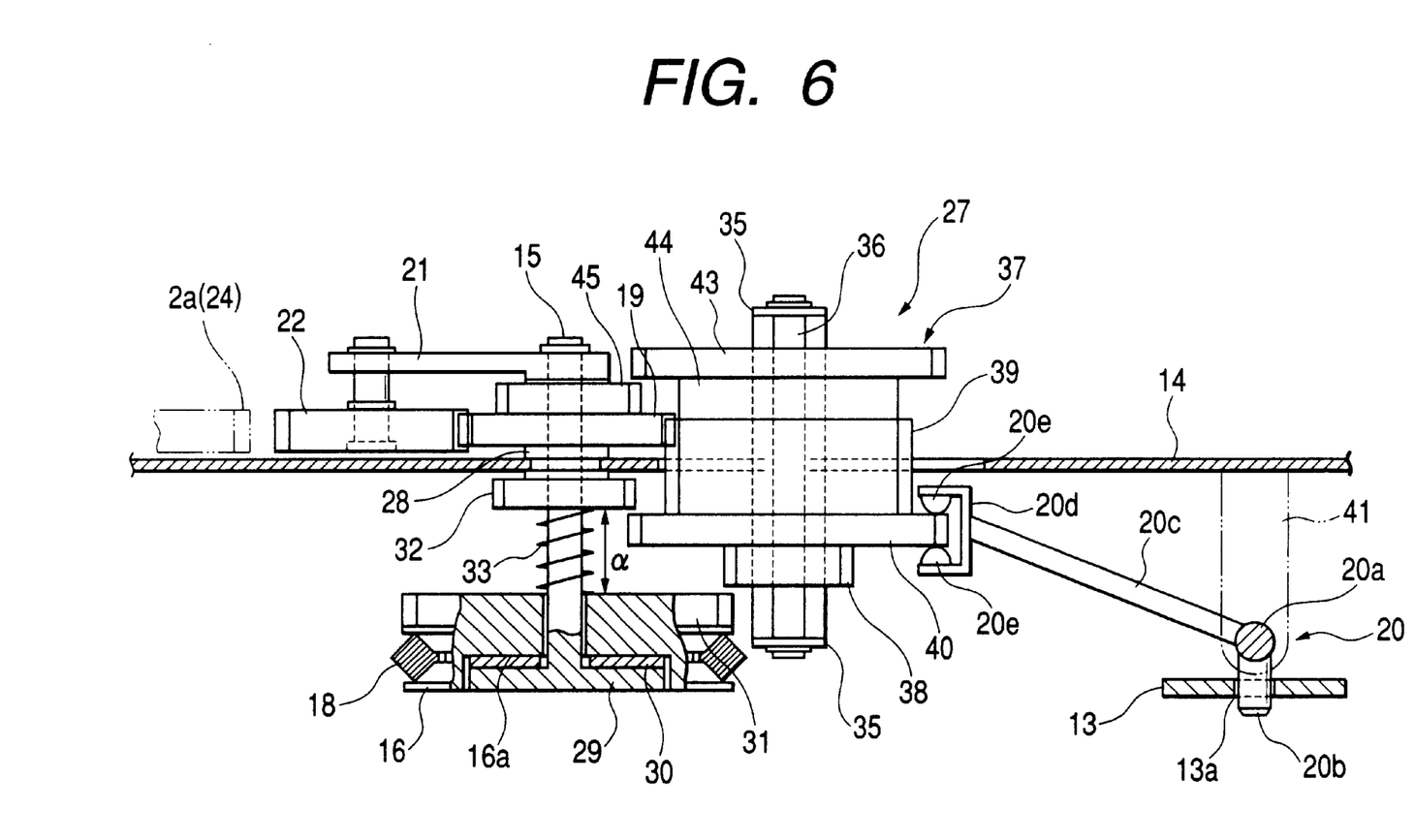
FIG. 6 is an enlarged view in a longitudinal section of a magnetic tape apparatus according to another embodiment of the invention.

FIG. 6 shows an essential part of the magnetic tape apparatus according to another embodiment of the invention. At an upper end of the movable rotary body 37, there is integrally formed a large high speed gear 43 which is larger in diameter than the large diametered gear 39. Between the large high speed gear 43 and the large diametered gear 39, there is formed an annular groove 44 which is not engaged with the driven gear 32, and at an upper end of the intermediate gear 19, there is integrally formed a small high speed gear 45 which can be meshed with the large high speed gear 43. Other parts than the above described are substantially the same as those in the embodiment as shown in FIGS. 1 to 5, and therefore, the same parts will be denoted with the same reference numerals and description of them will be omitted.

Figure 7:
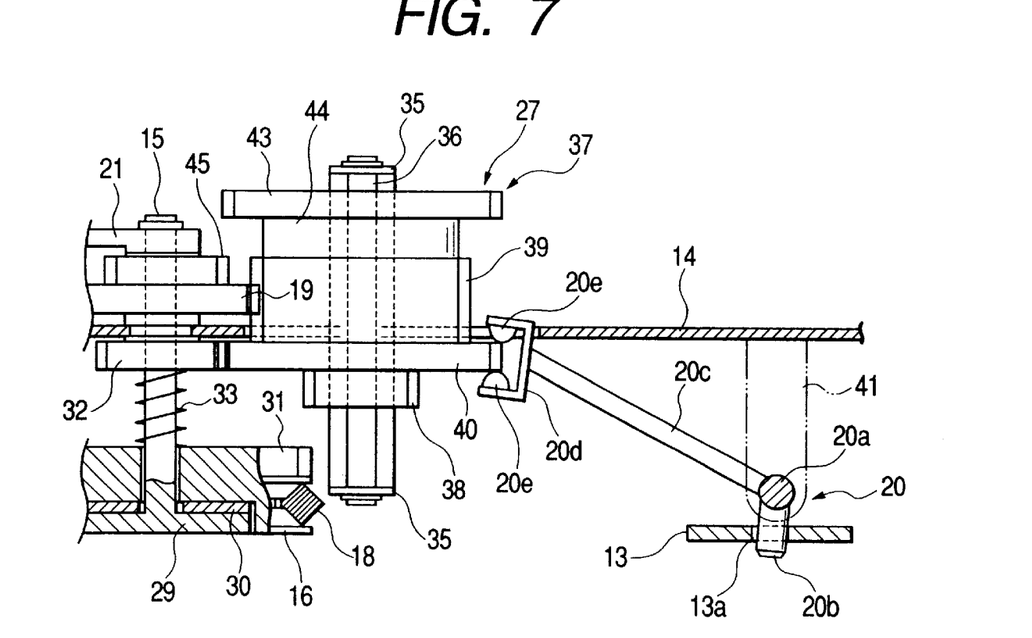
FIG. 7 is an enlarged view in a longitudinal section of the essential part of the same in the play back mode and the play back rewind mode.

In the above described structure, in order to switch the mode from the stop mode as shown in FIG. 6 to the play back mode and the play back rewind mode, the mode switch lever 13 may be shifted in the direction of the arrow mark b. This allows the movable rotary body 37 to be pushed upward as shown in FIG. 7 thereby to mesh the large low speed gear 40 with the driven gear 32. Through the same steps as in the embodiment as shown in FIGS. 1 to 5, the magnetic tape T is rolled up around the pay-off reel table 2 or the roll-up reel table 3.

Figure 8:
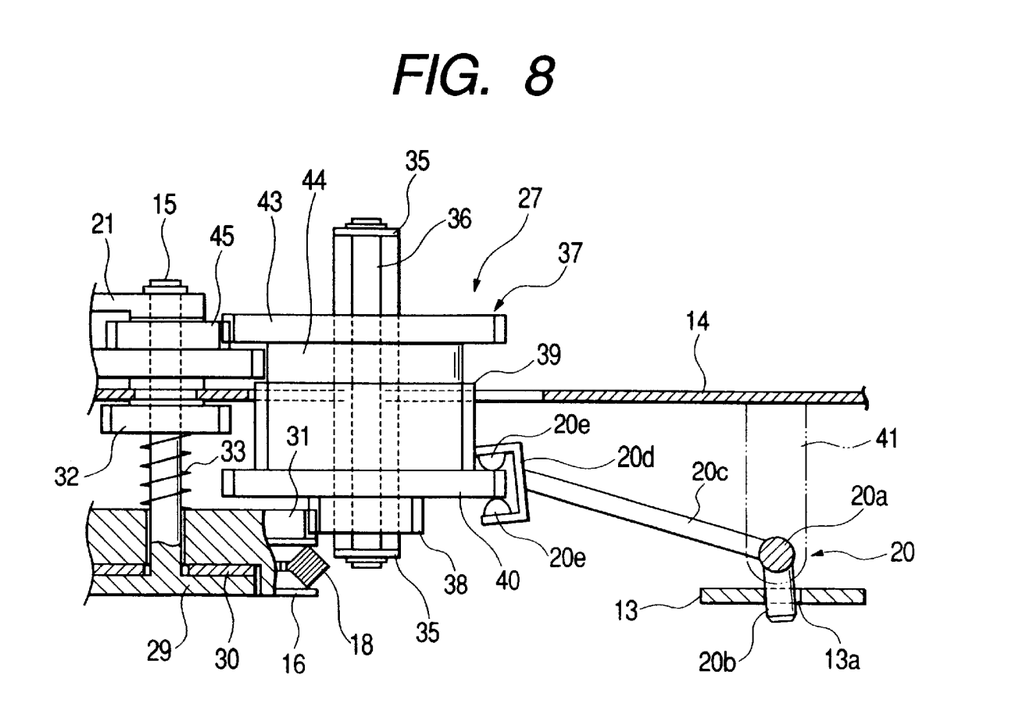
FIG. 8 is an enlarged view in a longitudinal section of the essential part of the same in the fast feed mode and the rewind mode.

In order to switch the mode from the stop mode as shown in FIG. 6 to the fast feed mode and the rewind mode, the mode switch lever 13 may be shifted in the direction of the arrow mark a. This allows the movable rotary body 37 to be pushed downward as shown in FIG. 8 thereby to mesh the large high speed gear 43 with the small high speed gear 45, and at the same time, the small diametered gear 38 is meshed with the drive gear 31. Due to a gear ratio between the large high speed gear 43 and the small diametered gear 38, the magnetic tape T can be rolled up around the pay-off reel table 2 or the roll-up reel table 3 at higher speed than in the embodiment as shown in FIGS. 1 to 5.

Effects of the Invention

According to the invention as in aspect 1, the fast feed and the rewind of the magnetic tape can be finished in a short time, because the rotation speed of the pay-off reel table or the roll-up reel table can be increased by the speed increasing mechanism in the fast feed mode and the rewind mode.

According to the invention as in aspect 2, in the fast feed mode and the rewind mode, the rotation speed of the pay-off reel table or the roll-up reel table can be increased due to the gear ratio between the large diametered gear and the small diametered gear. Moreover, because the structure of the speed increasing mechanism is simple, the magnetic tape apparatus is difficult to be broken and can be manufactured at a low cost.

According to the invention as in aspect 3, in the fast feed mode and the rewind mode, by meshing the large high speed gear integrally formed with the movable rotary body with the intermediate gear, the rotation speed of the pay-off reel table or the roll-up reel table can be further increased.

According to the invention as in aspect 4, by meshing the large low speed gear provided on the movable rotary body with the driven gear, the speed increasing mechanism can be switched also to the play back mode and the play back rewind mode and can be conveniently used.

According to the invention as in aspect 5, by switching the mode from the fast feed mode and the rewind mode to the stop mode, the movable rotary body is set in the neutral position, thereby to instantaneously interrupt the rotary drive force of the drive gear. Therefore, the magnetic tape can be prevented from being excessively rolled up around the pay-off reel table or the roll-up reel table.

What is claimed is:

1. A magnetic tape apparatus comprising:
    an intermediate gear meshed with an idler gear which can be releasably meshed with a pay-off reel table and a roll-up reel table,
    a drive gear rotatably driven by drive means, and
    a driven gear which can be releasably meshed with said drive gear by way of a slip mechanism, wherein
        said intermediate gear is directly connected to said drive gear in a fast feed mode and a rewind mode and indirectly connected to said drive gear by way of said slip mechanism and said driven gear in a play back mode and a play back rewind mode, and
        said intermediate gear is connected to said drive gear by way of a speed increasing mechanism in the fast feed mode and the rewind mode.

2. The magnetic tape apparatus as claimed in claim 1, wherein
    said speed increasing mechanism comprises a movable rotary body which is rotatably mounted around a support shaft and adapted to reciprocate along an axis of said support shaft, said movable rotary body including a small diametered gear and a large diametered gear, and in the fast feed mode and the rewind mode, said large diametered gear is meshed with said intermediate gear while said small diametered gear is meshed with the drive gear.

3. The magnetic tape apparatus as claimed in claim 2, wherein said movable rotary body comprises integrally a large high speed gear which is larger in diameter than said large diametered gear, and in the fast feed mode and the rewind mode, said large high speed gear is meshed with said intermediate gear while said small diametered gear is meshed with said drive gear.

4. The magnetic tape apparatus as claimed in claim 2, wherein said movable rotary body comprises a large low speed gear, and in the play back mode and the play back rewind mode, said large diametered gear is meshed with said intermediate gear while said large low speed gear is meshed with said driven gear.

5. The magnetic tape apparatus as claimed in claim 4, wherein said movable rotary body comprises a neutral position in which said small diametered gear and said large low speed gear are not meshed with each other, and said movable rotary body is set at said neutral position in a stop mode.

* * * * *